United States Patent
Fontana et al.

(10) Patent No.: US 10,244,776 B2
(45) Date of Patent: Apr. 2, 2019

(54) GRANULATED FEED PHOSPHATE COMPOSITION INCLUDING FEED ENZYMES

(71) Applicant: The Mosaic Company, Plymouth, MN (US)

(72) Inventors: Eddy A. Fontana, Lithia, FL (US); Charlotte Brittain, Tampa, FL (US); Everett L. Jones, Winter Haven, FL (US); Bryan Baylor, Lithia, FL (US); Sal Nsheiwat, Brandon, FL (US); Ryan Thomas, Bradenton, FL (US); Reinaldo M. Marsella, Lakeland, FL (US)

(73) Assignee: The Mosaic Company, Plymouth, MN (US)

( * ) Notice: Subject to any disclaimer, the term of this patent is extended or adjusted under 35 U.S.C. 154(b) by 0 days.

(21) Appl. No.: 15/852,918

(22) Filed: Dec. 22, 2017

(65) Prior Publication Data

US 2018/0116248 A1 May 3, 2018

Related U.S. Application Data

(63) Continuation of application No. 14/204,417, filed on Mar. 11, 2014, now Pat. No. 9,848,621.

(60) Provisional application No. 61/776,275, filed on Mar. 11, 2013.

(51) Int. Cl.
| | |
|---|---|
| *A23K 10/30* | (2016.01) |
| *A23K 40/25* | (2016.01) |
| *A23K 40/10* | (2016.01) |
| *A23K 40/20* | (2016.01) |
| *A23K 20/189* | (2016.01) |
| *A23K 20/22* | (2016.01) |
| *A23K 20/26* | (2016.01) |
| *A23K 20/28* | (2016.01) |
| *A23K 50/75* | (2016.01) |

(52) U.S. Cl.
CPC ............ *A23K 10/30* (2016.05); *A23K 20/189* (2016.05); *A23K 20/22* (2016.05); *A23K 20/26* (2016.05); *A23K 20/28* (2016.05); *A23K 40/10* (2016.05); *A23K 40/20* (2016.05); *A23K 40/25* (2016.05); *A23K 50/75* (2016.05)

(58) Field of Classification Search
CPC ...... A23K 10/30; A23K 20/189; A23K 20/22; A23K 20/26; A23K 20/28; A23K 40/10; A23K 40/20; A23K 40/25; A23K 50/75
See application file for complete search history.

(56) References Cited

U.S. PATENT DOCUMENTS

| | | | |
|---|---|---|---|
| 3,060,511 A | * | 10/1962 | Parmella .................. B29B 9/06 264/142 |
| 3,079,260 A | | 2/1963 | Galler |
| 3,134,719 A | | 5/1964 | Sheth et al. |
| 3,189,433 A | | 6/1965 | Hollingsworth et al. |
| 3,266,886 A | | 8/1966 | Middleton |
| 3,441,511 A | | 4/1969 | Otrhalek et al. |
| 3,630,930 A | | 12/1971 | Davis et al. |
| 3,661,786 A | * | 5/1972 | Desforges .......... C11D 3/38672 435/188 |
| 3,897,575 A | | 7/1975 | White |
| 3,931,416 A | | 1/1976 | Grams |
| 4,101,636 A | | 7/1978 | Larson et al. |
| 4,115,307 A | | 9/1978 | McGilvery |
| 4,180,485 A | | 12/1979 | Llenado |
| 4,218,437 A | | 8/1980 | Hiller |
| 4,681,914 A | * | 7/1987 | Olson ................. C11D 17/0039 252/186.35 |
| 4,873,111 A | | 10/1989 | Aaltonen et al. |
| 4,994,282 A | | 2/1991 | Miller |
| 5,066,441 A | | 11/1991 | Gerald |
| 5,643,622 A | | 7/1997 | Sawhill |
| 5,935,625 A | | 8/1999 | Hjørnevik et al. |
| 6,113,974 A | | 9/2000 | Winowiski et al. |
| 6,776,816 B1 | | 8/2004 | Ringelberg et al. |
| 7,014,863 B2 | | 3/2006 | Apajalahti et al. |
| 7,081,563 B2 | | 7/2006 | Lanahan et al. |
| 8,012,519 B2 | | 9/2011 | Kane et al. |
| 8,834,945 B2 | | 9/2014 | Kane et al. |

(Continued)

FOREIGN PATENT DOCUMENTS

| | | |
|---|---|---|
| CN | 1140555 A | 1/1997 |
| CN | 1684757 A | 10/2005 |

(Continued)

OTHER PUBLICATIONS

Application and File history for U.S. Appl. No. 14/204,417, filed Mar. 11, 2014. Inventors: Fontana et al.

(Continued)

*Primary Examiner* — C. Sayala

(74) *Attorney, Agent, or Firm* — Patterson Thuente Pedersen, P.A.

(57) ABSTRACT

A granulated phosphate composition that provides sufficient nutritional value as well as enhanced bioavailability of organic phosphorous present in a main feed ingredient. The granulated phosphate composition includes a phosphate source, such as monocalcium phosphate, mono-dicalcium phosphate, or dicalcium phosphate, and one or more feed enzymes such as phytase. When the phosphate composition is compounded and pelleted with a main feed ingredient into a feed pellet, and consumed by a non-ruminant, the phytase component of the phosphate composition liberates otherwise unavailable phosphorous present in the main feed ingredient.

14 Claims, No Drawings

(56) References Cited

U.S. PATENT DOCUMENTS

| | | | |
|---|---|---|---|
| 9,848,621 | B2 | 12/2017 | Fontana et al. |
| 2003/0190390 | A1 | 10/2003 | Moore |
| 2005/0163911 | A1 | 7/2005 | McGowen et al. |
| 2006/0141098 | A1 | 6/2006 | Persson et al. |
| 2006/0147546 | A1 | 7/2006 | Ferlin et al. |
| 2006/0170128 | A1 | 8/2006 | Belanger et al. |
| 2006/0228400 | A1 | 10/2006 | Lanahan et al. |
| 2008/0031998 | A1 | 2/2008 | Marcussen |
| 2008/0031999 | A1 | 2/2008 | Marcussen et al. |
| 2008/0241227 | A1 | 10/2008 | Franz et al. |
| 2010/0068341 | A1* | 3/2010 | Lohscheidt .... C12Y 301/03026 426/61 |
| 2010/0124586 | A1* | 5/2010 | Becker .............. A61K 9/5073 426/61 |
| 2011/0177203 | A1 | 7/2011 | Kane et al. |
| 2011/0177204 | A1 | 7/2011 | Kane et al. |
| 2011/0206799 | A1 | 8/2011 | Hermsmeyer |
| 2011/0293792 | A1 | 12/2011 | Kane et al. |

FOREIGN PATENT DOCUMENTS

| | | | |
|---|---|---|---|
| EP | 0090995 | | 10/1983 |
| EP | 175805 | A | 4/1986 |
| EP | 0809941 | A1 | 3/1997 |
| GB | 1070668 | | 6/1967 |
| GB | 1275280 | | 5/1972 |
| GB | 1498285 | | 1/1978 |
| GB | 2129410 | A | 5/1984 |
| GB | 2332426 | A | 6/1999 |
| JP | 5184309 | A | 7/1993 |
| JP | 2005281732 | A | 10/2005 |
| SU | 1740357 | A1 | 6/1992 |
| WO | WO 9616151 | A1 * | 5/1996 ......... C11D 3/38672 |
| WO | WO 99/49740 | A1 | 10/1999 |
| WO | WO 2003-037102 | A2 | 5/2003 |
| WO | WO 2006/034098 | A1 | 3/2006 |
| WO | WO 2007/004967 | | 1/2007 |
| WO | WO 2011/088464 | A2 | 7/2011 |
| WO | WO 2013-012533 | A2 | 1/2013 |

OTHER PUBLICATIONS

Application and File history for U.S. Appl. No. 13/008,640, filed Jan. 18, 2011. Inventors: Kane et al.
Application and File history for U.S. Appl. No. 13/078,557, filed Apr. 1, 2011. Inventors: Kane et al.
Application and File history for U.S. Appl. No. 13/184,086, filed Jul. 15, 2011. Inventors: Kane et al.
"Avizyme®" 2010 Handbook of Feed Additives, 2006, Ed Simon Mounsey, Pub. Simon Mounsey Ltd., 4 pages.
Office Action dated Dec. 26, 2013 for Chinese Application No. 201180005753.6 filed Jan. 18, 2011, 14 pages.
A document entitled "Animal Feeds Granulation", 2010, http://feeco.com/uploads/project-profiles/animal-feeds-granulation.pdf, 1 page.
Biofos® Product Specification, The Mosaic Company, Dec. 18, 2009, 1 page.
Multifos® Product Specification, The Mosaic Company, May 4, 2009, 1 page.
PCT Search Report dated Oct. 20, 2011 for PCT Application No. PCT/US2011/021565 filed Jan. 18, 2011, 8 pages.
PCT Search Report dated Jan. 25, 2013 for PCT Application No. PCT/US2012/044526 filed Jun. 28, 2012, 11 pages.
Office Action dated Mar. 28, 2013 for Chinese Application No. 201180005753.6 filed Jan. 18, 2011, 19 pages.
"Phosphate Rock" downloaded from www.mineralseducationcoalition.org/minerals/phosphate-rock, 2 pages dated Mar. 2003.
"Triple Superphosphate" downloaded from www.techsheets.simplot.com/Plant_Nutrients/12030_TSP0-45-).pdf, 2 pages dated Mar. 2003.
Cheremisinov, "Superphosphate", downloaded from http://encyclopedia2.thefreedictionary.com/Superphospate, The Great Soviet Encyclopedia, 3rd Edition (1970-1979), 1 page.
PCT Search Report dated Jul. 10, 2014 for PCT Application No. PCT/US2014/023407 filed Mar. 11, 2014, 13 pages.
Wu, Y.B., et al., "Influence of Three Phytase Preparations in Broiler Diets Based on Wheat or Corn: In vitro Measurements of Nutrient Release", 2004 International Journal of Poultry Science, vol. 3(7), pp. 450-455.
Office Action dated Jan. 22, 2016 for Australian Patent Application No. 2014249014, 5 pages.
Office Action for Pakistan Application No. 178/2014, known to applicant at least as of Mar. 20, 2017, 1 page.
Examination Report dated Jul. 5, 2017 for Australian Application No. 2017200403, 4 pages.
Notice of Acceptance date Jun. 28, 2018 for Australian Application No. 2017200403, 3 pages.
Examination Report dated Aug. 24, 2018 for Philippines Application No. 1/2015/501893, 6 pages.
Lawrence, A., *Understanding Food Additives*, York: Chemical Industry Education Centre, 1998, 142 pages.

* cited by examiner

GRANULATED FEED PHOSPHATE COMPOSITION INCLUDING FEED ENZYMES

RELATED APPLICATIONS

This application is a continuation of application Ser. No. 14/204,417 filed Mar. 11, 2014, which claims the benefit of U.S. Provisional Application No. 61/776,275 filed Mar. 11, 2013, each of which is incorporated herein in its entirety by reference.

FIELD OF THE INVENTION

The present invention generally relates to additives for animal feed, and more particularly a phosphate composition incorporating feed enzymes to increase the bioavailability of phosphorous by providing, in addition to the inorganic phosphorous of the phosphate composition, organic phosphorous.

BACKGROUND OF THE INVENTION

Animal and poultry feed, generally known as compound feed, are feedstuffs that are blended from various raw materials and additives. Compound feeds can be prepared as complete feeds that provide all the daily required nutrients, as concentrates that provide a part of the ration (protein, energy), or as supplements that provide additional micronutrients such as minerals and vitamins. A main ingredient used in commercially prepared feed is feed grains such as, for example, corn, soybeans, sorghum, oats, barley, and combinations thereof.

An important industry within the animal feed industry further includes the sale and manufacture of premixes. Premixes can be composed of micro-ingredients for blending into commercial or individually-produced rations to produce animal feed. Micro-ingredients can include nutrients, vitamins, minerals, chemical preservatives, antibiotics, fermentation products, enzymes, and other essential ingredients.

A source of phosphorous and calcium is commonly added to animal feed as a micro-ingredient. One example of such ingredient that can be used in animal feed is Biofos®. Biofos® is a feed-grade monocalcium phosphate that is produced by reacting calcium carbonate and wet process defluorinated phosphoric acid. Biofos® is a source of highly available phosphorous (P) and calcium (Ca) with a narrow calcium-to-phosphate ratio, such that it helps meet animal and poultry requirements for these essential nutrients. For example, Biofos® guarantees a minimum 21% phosphorous content, and calcium content in a range from about 15.0 to 18.0%, which allows for flexibility and economy in formulations. Biofos® also provides ease of handling and uniform dispersion in mixed feeds and minerals.

Similarly, Dynafos® is a feed grade dicalcium phosphate produced by reacting wet process defluorinated phosphoric acid with calcium carbonate. Like Biofos®, it is a source of highly available phosphorous (P) and calcium (Ca) that has approximately a 1.1 to 1 calcium:phosphorous ratio, and guarantees a minimum 18.5% phosphorous content, and calcium content in a range from about 20.0% to 24.0%.

Another example micro-ingredient used as a source for phosphorous and calcium in animal feed is Multifos®. Multifos® is a feed-grade tricalcium/defluorinated phosphate, which is derived from phosphate rock in a carefully controlled thermochemical process that enhances biological availability, drives off fluorine, and physically conditions the product for feed mixing. Like Biofos®, Multifos® is a source of highly available phosphorous (P) and calcium (Ca), as well as sodium (Na), that will help provide animal and poultry requirements for these nutrients. For example, Multifos® guarantees a minimum 18% phosphorous content, calcium content in a range from about 30.0 to 34.0%, and sodium content around 5%, which again allows flexibility in feed formulation.

Yet another example micro-ingredient used as a source for phosphorous and calcium in animal feed is Nexfos®. Nexfos® is a granulated feed-grade monodicalcium phosphate incorporating lubricity and abrasivity additives for high throughput and improved energy efficiencies in pelletizing processes. Like Biofos®, Nexfos® is a source of highly available phosphorous (P), calcium (Ca), and sodium (Na), with a narrow calcium-to-phosphate ratio, such that it helps meet animal and poultry requirements for these essential nutrients. For example, Nexfos® guarantees minimum 19% phosphorous content, calcium content in a range of from about 15.0% to 18.0%, and sodium content in a range of from about 4.0% to 5.0%, which allows for flexibility and economy in formulations. Such composition is described in one or both of U.S. Pat. No. 8,012,519 entitled "Granulated monocalcium phosphate product containing abrasivity and lubricity additives," and U.S. Patent Application Publication No. 2011/0293792 entitled "Granulated phosphate product containing abrasivity and lubricity additives," both of which are incorporated herein by reference in their entireties.

Feed blends are formulated according to specific requirements of a target animal. Feed manufactures or compounders prepare the blends by buying the commodities, i.e. the main ingredients, such as, for example, corn, soybeans, sorghum, oats, and barley, and any desired micro-ingredients, and blending or compounding them in a feed mill according to specifications provided by a nutritionist, for example. The blends can be manufactured by feed compounders as meal type, pellets, or crumbles.

One type of feed mill found in the industry for producing feed blends is a pellet mill, which blends a mixture of dry powdered feedstock, such as, for example, flour or grass, a wet ingredient, such as steam or molasses, and any other ingredients, such as micro-ingredients. The dry feedstock, wet ingredient, and any other ingredients are combined to form a mash or meal. The mash or meal is then compacted into an interior of a round die that contains many small holes. The mash or meal is compacted within the die thereby forcing it out of the holes in the form of pellets, to ultimately be fed to livestock.

Although the micro-ingredients provide a highly bioavailable source of inorganic phosphorous, organic phosphorous is also present in animal feed in plant tissue that makes up the main ingredient. However, this phosphorous is present as phytic acid, or inositol hexakisphophate (phytate in salt form), which is indigestible to nonruminant animals, such that the organic phosphate is not available to the animal, and is excreted to the surrounding environment. This unabsorbed or unavailable phosphorous can become potentially hazardous to the immediate surroundings, if introduced into the environment in large quantities.

It is known in the art to add a feed enzyme to animal feed as a separate micro-ingredient, as discussed, for example, in a publication entitled "Considerations on the use of microbial phytase," by Cefic (January, 2006). A suitable feed enzyme, phytase, or myo-inositol hexakisphosphate phosphohydrolase, is any type of phosphatase enzyme that catalyzes the hydrolysis of phytic acid, rending the phosphorous digestible, such that the organic phosphorous becomes an added source of phoshphorous. Phytase is typically bulk blended with the inorganic source of phosphorous, such as Biofos®, Multifos®, Dynafos® or Nexfos®. However, differences in particle size causes settling during transportations and/or storage such that stratification occurs, resulting in uneven distribution of phytase in each animal pellet, and therefore variability in phosphorous content.

Alternatively, separate transportation and storage of the feed enzyme is required, and the feed enzyme is added to the feed composition during pelleting. However, this requires additional storage space, additional manufacturing steps, and potential added cost for having an additional component to be added.

There remains a need for a phosphate ingredient or feed additive for animal feed directly incorporating a feed enzyme, such that the consistent amounts of feed enzyme and inorganic phosphorous is distributed throughout each feed pellet after pelleting, thereby rendering both inorganic and organic phosphorous highly available in the animal feed.

SUMMARY OF THE INVENTION

Embodiments of the present disclosure are directed to a granulated phosphate composition feed additive for incorporation into animal and poultry feed that provides sufficient nutritional value including phosphorous availability, by rendering both organic and inorganic sources of phosphorous in the feed highly bioavailable. Optionally, the animal feed can have enhanced pelleting benefits, such as abrasiveness and lubricity. More particularly, the compositions of the embodiments of the present invention provide similar or better nutritional value than other feed-grade micro-ingredients, such as a Multifos® or Biofos® product, by facilitating the liberation of otherwise unavailable organic phosphorous in the feed base composition. Further, the compositions of the embodiments are manufactured using a granulation process as opposed to a more expensive rotary kiln process.

In particular, the compositions of the embodiments provide a source of inorganic phosphorous in the form of monocalcium phosphate ($Ca(H_2PO_4)_2$ or calcium dihydrogen phosphate), dicalcium phosphate ($CaHPO_4$ dibasic calcium phosphate), and/or mono-dicalcium (a chemically obtained intermediate between monocalcium phosphate and dicalcium phosphate or CaHPO4, $Ca(H2PO4)_2.H2O$), as well as an enzyme to liberate organic phytate-bound phosphorous that is present in the vegetable-based or grain feed materials.

In some aspects, the compositions of embodiments of the present invention can include a granulated phosphate feed ingredient composition comprising a phosphate source such as monocalcium phosphate, mono-dicalcium phosphate, dicalcium phosphate, or combinations thereof, and a feed enzyme present in an amount of about that will provide approximately 200 to 2,000 FYU (phtyase units) per kilogram (FTU/kg) of compounded or complete feeds. The feed enzyme can comprise, for example, a phytase including a histidine acid phosphatase (HAP), a β-propeller phytase, a purple acid phophatase (PAP), a protein tyrosine phosphatase (PTP), or combinations thereof. More specifically, the phytase can comprise a highly specific phytase for phytic acid, such as phytases from *Bacillus* sp., *Aspergillus* sp., *E. coli* and those phytases belonging to the class of PTP-like phytases.

In some aspects, the compositions of embodiments of the present invention further comprise one or more additional feed enzymes, such as, for example, amylases, xylanases, and proteases. Other feed enzymes aid in the digestion or breakdown of certain components in the base feed composition, making additional sources of nutrition bioavailable to the animal and/or aiding in the digestion of the animal feed. These other enzymes can be present in an amount of about 50 to 500 grams per ton of complete feeds.

Amylase is an enzyme which catalyzes the breakdown of starch into sugars for its absorption. More particularly, starch is a complex carbohydrate or polysaccharide, and therefore a large molecule. Because the cells in the body include a partially permeable membrane, they cannot absorb these starches unless they are broken down into glucose.

Xylanase is an enzyme for breaking down non-starch polysaccharides (NSPs). For example, xylanases degrade the linear polysaccharide beta-1,4-xylan into xylose, thus breaking down hemicellulose, one of the major components of plant cell walls. This is important because as hemicellulose increases, voluntary feed intake, or the amount of feed eaten by animal when the feed is given to it without restriction, decreases because the undigested polysaccharides increase the gastrointestinal viscosity in the digestive tract due to their binding to water and swelling. Therefore, by breaking down hemicellulose or reducing its presence, voluntary feed intake will not be negatively affected. Furthermore, xylanases aid in the release of nutrients otherwise trapped in the cell walls of plants used in the animal feed.

Proteases are enzymes that break down proteins in food so that they are digestable and absorbable. Similarly to starches, because the cells in the body include a partially permeable membrane, they cannot absorb complex, long chain proteins unless they are broken down to liberate the amino acids needed by the body. Specifically, proteases are enzymes that conduct proteolysis, that is, begin protein catabolism by hydrolysis of the peptide bonds that link amino acids together in the polypeptide chain forming the protein, so that the body's cells can absorb the amino acids.

In some aspects, the compositions of embodiments of the present invention can further include a lubricity additive in the form of a sodium additive to generate sodium phosphate to lubricate the die during pelleting to prevent or inhibit product buildup and clogging of the die. The sodium additive is present in an amount that provides a sodium content of about one to about ten percent by weight of the composition. The sodium additive can comprise, for example, sodium carbonate, sodium hydroxide, monosodium phosphate, potash, or combinations thereof.

In yet other aspects, the compositions of embodiments of the present invention can optionally include an abrasive or abrasivity additive that aids in scouring and cleaning the die during pelleting operations. The abrasivity additive is present in an amount of about one to about ten percent by weight of the composition. The abrasive additive can comprise, for example, silica, such as silica sand.

In yet other aspects, embodiments of the present invention can comprise an animal feed base material, and a granulated phosphate composition including a source of inorganic phosphorous and a feed enzyme, wherein the animal feed is pelleted via a pellet mill. The phosphate source comprises as monocalcium phosphate, mono-dicalcium phosphate, dicalcium phosphate, or combinations thereof, and the feed enzyme comprises a phytase.

The above summary of the invention is not intended to describe each illustrated embodiment or every implementation of the present invention. The detailed description that follows more particularly exemplifies these embodiments.

DETAILED DESCRIPTION

In one embodiment of the present invention, a granulated phosphate feed additive composition for incorporation into an animal feed formulation includes a phosphate source, such as monocalcium phosphate, mono-dicalcium phosphate, dicalcium phosphate, or combinations thereof, and one or more feed enzymes. The one or more feed enzymes can provide product attributes, such as, for example, the ability to liberate organic sources of phosphorous available in the feed material such as, for example, flour, grass, a vegetable material, and/or feed grains such as corn, soybeans, sorghum, oats, rye, and barley and the like, or combinations thereof. The granulated phosphate product can provide nutritional attributes, such as, for example, sufficient availability of phosphorous, calcium, and/or sodium, in a final feed formulation that are similar to or exceed those currently exhibited by the addition of existing feed-grade micro-ingredients, such as Multifos® and Biofos® to the final feed formulation.

In one particular embodiment, a phosphate source is produced by a reaction of calcium carbonate and wet process defluorinated phosphoric acid, forming a slurry of monocalcium phosphate, mono-dicalcium phosphate, dicalcium phosphate, or combinations thereof. Temperature, reactant levels, and other factors allows for the amounts or ratio of desired forms of the phosphate source slurry. The slurry is then sent to a granulator, such as a rotating drum granulator, to produce granules of the phosphate product.

One or more feed enzymes are introduced into the phosphate slurry before granulation and/or during granulation. The feed enzyme is typically in the form of a powder, granules, or liquid form. In an embodiment of the invention, a feed enzyme is introduced in an amount such that it is present in an amount of about 200 to 2,000 FTU/kg of complete feed.

The feed enzyme can comprise, for example, a phytase including a histidine acid phosphatase (HAP), a β-propeller phytase, a purple acid phophatase (PAP), a protein tyrosine phosphatase (PTP), or combinations thereof. More specifically, the phytase can comprise a highly specific phytase for phytic acid, such as phytases from *Bacillus* sp., *Aspergillus* sp., *E. coli* and those phytases belonging to the class of PTP-like phytases.

The phosphate composition according to embodiments of the invention provides sufficient nutrients to the final feed product for consumption by the target animal. In one embodiment of the present invention, the phosphate composition comprises a monocalcium phosphate or monodicalcium phosphate, having a minimum phosphorous content of about 21% P, and a minimum sodium content of 4% Na. Furthermore, the phosphate composition can closely resemble the currently available Biofos® product in that the phosphate composition comprises a calcium content in a range from about 15% to about 30%, a maximum fluorine content of about 0.21%, a bulk density of about 56-59 lbs/ft$^3$, a moisture content of about 1%, and a pH of about 3.6. A sieve analysis using a Tyler mesh scale, in which the mesh size is the number of openings per (linear) inch of mesh, can also resemble the Biofos® product, wherein 99.7% of the granules pass a 12 Mesh screen, 88% pass a 16 Mesh screen, 73.4% pass a 20 Mesh screen, and 1.0% pass a 100 Mesh screen.

In another embodiment of the invention, the phosphate composition comprises a monocalcium phosphate or monodicalcium phosphate having a minimum phosphorous content of about 18% P, and a minimum sodium content of 4% Na. Furthermore, the phosphate composition can closely resemble the currently available Nexfos® product in that the phosphate composition comprises a calcium content in a range from about 15% to about 18%, a maximum fluorine content of about 0.18%, a bulk density of about 82-85 lbs/ft$^3$, a moisture content of about 0.6%, and a pH of about 6.0. A sieve analysis using a Tyler mesh scale, in which the mesh size is the number of openings per (linear) inch of mesh, can also resemble the Multifos® product, wherein 98.1% of the granules pass a 12 Mesh screen, 4.9% pass a 100 Mesh screen, and 1.2% pass a 200 Mesh screen.

In yet another embodiment of the invention, the phosphate composition comprises a dicalcium phosphate having a minimum phosphorous content of about 18.5% P, and a calcium content in a range from about 20.0 to 24.0% Ca. Furthermore, the phosphate composition can closely resemble the currently available Dynafos® product in that a maximum fluorine content is about 0.185%, a bulk density of about 57-60 lbs/ft$^3$, a moisture content of about 1%, and a pH of about 4.0. A sieve analysis using a Tyler mesh scale, in which the mesh size is the number of openings per (linear) inch of mesh, can also resemble the Dynafos® product, wherein 99.6% of the granules pass a 12 Mesh screen, 82.6% pass a 20 Mesh screen, 9.9% pass a 48 Mesh screen, and 0.4% pass a 100 Mesh screen.

The phosphate composition can optionally comprise one or more additional feed enzymes, such as, for example, amylases, xylanases, and/or proteases, added to the phosphorous slurry before and/or during granulation. Other feed enzymes aid in the digestion or breakdown of certain components in the base feed composition, making additional sources of nutrition bioavailable to the animal and/or aiding in the digestion of the animal feed. These other enzymes can be present in an amount of about 50 to 500 g per ton of complete feeds.

The phosphate compositions can optionally include a sodium additive present in an amount that provides a sodium content of about one to about ten percent by weight of the composition. The sodium additive can comprise, for example, sodium carbonate, sodium hydroxide, monosodium phosphate, potash, or combinations thereof.

In yet another embodiment, the compositions of embodiments of the present invention can optionally include an abrasive or abrasivity additive in an amount of about one to about ten percent by weight of the composition. The abrasive additive can comprise, for example, silica, such as silica sand. The optional lubricity and abrasivity additives help to reduce product build-up in the pelleting die as discussed in detail in U.S. Pat. No. 8,012,519 and U.S. Patent Application Publication No. 2011/0293792, both of which were previously incorporated by reference in their entireties.

The phosphate composition feed additive according to embodiments of the invention is blended with the appropriate main feed ingredient at amounts formulated according to specific requirements of a target animal. The phosphate composition is added to the main feed ingredients, such as, for example, corn, soybeans, sorghum, oats, rye, barley, and any other desired micro-ingredients. The mix is blended or compounding in a feed mill, such as a pellet mill, according to specifications provided by a nutritionist, for example. The blends can be manufactured by feed compounders as meal type, pellets, or crumbles, as discussed above.

In one particular embodiment, the phosphate composition is blended with the main feed ingredient and any other desired micro-ingredient in a pellet mill. In the pellet mill, a mixture of dry powdered feedstock, such as, for example, flour, grass, corn, soybeans, sorghum, oats, rye, barley, or combinations thereof, a wet ingredient, such as steam or molasses, the phosphate composition, and any other ingredients, such as micro-ingredients are combined to form a mash or meal. The mash or meal is then compacted into an interior of a round die of the pellet mill that contains many small holes. The mash or meal is compacted within the die thereby forcing it out of the holes in the form of pellets, to ultimately be fed to livestock.

The phosphate composition, due to the addition of the feed enzyme, make available an additional source of phosphorous to the animal when compounded with the main feed ingredient that can be made up of, for example, corn, soy, wheat, or the like, or combinations thereof. As discussed in the Background section, organic phosphorous is present in the grains and plants of the main feed ingredient as phytic acid or phytate. This phytic acid itself is indigestible to non-ruminant animals rendering the phosphorous an unavailable source. However, phytic acid has six phosphate groups that are available for release by phytases at different rates and in different order. Phytases hydrolyze phosphates from phytic acid in a stepwise manner, yielding products that again become substrates for further hydrolysis. Most phytases are able to cleave five of the six phosphate groups from phytic acid, thereby rendering the otherwise phtyate-bound phosphorous bioavailable to the animal. Therefore, by incorporating the phytase into the phosphate composition, which is then compounded and pelleted with the main feed ingredient, such as via a pellet mill, the phytase can liberate this organic source of phosphorous in the main feed ingredient when the animal feed pellets are consumed by the animal.

The present invention may be embodied in other specific forms without departing from the essential attributes thereof; therefore, the illustrated embodiments should be considered in all respects as illustrative and not restrictive.

What is claimed is:

1. A method of preparing a granular phosphate additive to be added as a component in an animal feed formulation, the method comprising:
    forming a slurry of a phosphate source, wherein the phosphate source has a phosphorous content of at least 18%; and
    co-granulating the slurry with a feed enzyme to form a plurality of granules, each of the plurality of granules containing the feed enzyme.

2. The method of claim 1, wherein the phosphate source is selected from the group consisting of monocalcium phosphate, mono-dicalcium phosphate, dicalcium phosphate, and combinations thereof.

3. The method of claim 1, wherein the feed enzyme is selected from the group consisting of phytases, amylases, xylanases, proteases, and combinations thereof.

4. The method of claim 3, wherein the feed enzyme comprises a phytase.

5. The method of claim 4, wherein the phytase is added to the slurry in an amount such that the phytase provides from about 200 to about 2,000 FTU per kilogram of animal feed when the granulated phosphate composition is incorporated into the animal feed formulation.

6. The method of claim 4, further comprising: adding one or more additional feed enzymes before and/or during granulation, the one or more additional feed enzymes being selected from the group consisting of amylases, xylanases, proteases, and combinations thereof.

7. The method of claim 6, wherein the one or more additional feed enzymes is added to the slurry an amount to provide from about 50 to about 500 grams per ton of animal feed when the granulated phosphate composition is incorporated into the animal feed formulation.

8. The method of claim 1, further comprising:
    adding a lubricity additive to the slurry in the form of a sodium additive configured to lubricate a pelleting die when pelleting the animal feed formulation incorporating the granulated phosphate composition to prevent or inhibit product buildup and clogging of the die.

9. The method of claim 8, wherein the sodium additive is added in an amount that provides a sodium content of about one to about ten percent by weight of the granulated phosphate composition.

10. The method of claim 8, wherein the sodium additive comprises sodium carbonate, sodium hydroxide, monosodium phosphate, or combinations thereof.

11. The method of claim 1, further comprising:
    adding an abrasivity additive to the slurry, the abrasivity additive being configured to scour and clean a pelleting die via abrasive action when pelleting the animal feed formulation incorporating the granulated phosphate composition.

12. The method of claim 11, wherein the abrasivity additive is added in an amount of about one to about ten percent by weight of the granulated phosphate composition.

13. The method of claim 11, wherein the abrasivity additive comprises silica.

14. The method of claim 1, wherein the granulated phosphate composition comprises a phosphorous content of at least about eighteen percent by weight of the granulated phosphate composition.

* * * * *